United States Patent [19]
Takeuchi et al.

[11] Patent Number: 5,442,612
[45] Date of Patent: Aug. 15, 1995

[54] DIGITAL SIGNAL REPRODUCTION DEVICES, INTEGRATED CIRCUITS FOR USE THEREWITH, AND DIGITAL SIGNAL REPRODUCTION METHODS

[75] Inventors: Toshifumi Takeuchi, Yokohama; Shinichi Obata, Fujisawa; Izumi Kimura, Yokohama; Osamu Kawamae, Kawasaki; Hiroshi Tadokoro; Yutaka Nagai, both of Yokohama, all of Japan

[73] Assignee: Hitachi, Ltd., Tokyo, Japan

[21] Appl. No.: 144,527

[22] Filed: Nov. 2, 1993

[30] Foreign Application Priority Data

Nov. 11, 1992 [JP] Japan .................................. 4-301270
Aug. 30, 1993 [JP] Japan .................................. 5-214200

[51] Int. Cl.⁶ ............................ G11B 5/09; G11B 7/00
[52] U.S. Cl. ................................. 369/49; 369/44.32; 369/124; 360/51
[58] Field of Search ................... 369/44.32, 47, 49, 59, 369/53, 124; 360/26, 27, 36.2, 51

[56] References Cited
FOREIGN PATENT DOCUMENTS
2109203 5/1983 United Kingdom .

*Primary Examiner*—Georgia Y. Epps
*Assistant Examiner*—Nabil Hindi
*Attorney, Agent, or Firm*—Antonelli, Terry, Stout & Kraus

[57] ABSTRACT

A digital signal reproduction device including a data strobe circuit high in margin against noise and rapid in recovery from dropout of data and a digital signal reproduction method performed in such device. The digital signal reproduction device includes a pair of data strobe circuits and a switching circuit for selecting one of the outputs of the pair of data strobe circuits, and a circuit for generating from the received signal a signal to control the switching circuit. The data strobe circuits ensure high reliability of the received signal against noise and a short time from dropout of the received signal to acquisition of a reproduction clock. The data strobe circuit is selectable which is suitable for the reproduction state of the reproduced signal.

15 Claims, 10 Drawing Sheets

WHEN A CRACK DETECTION SIGNAL COVERS 8 SYNC INTERVALS OR LESS

WHEN A CRACK DETECTION SIGNAL COVERS 8 SYNC INTERVALS OR MORE

DIGITAL SIGNAL REPRODUCTION DEVICES, INTEGRATED CIRCUITS FOR USE THEREWITH, AND DIGITAL SIGNAL REPRODUCTION METHODS

BACKGROUND OF THE INVENTION

The present invention relates to digital signal reproduction devices, integrated circuits for use therewith, and digital signal reproduction methods, and more particularly to a reproduction device, for example, suitable for reproduction of a digital signal recorded on an optical disk, an integrated circuit for use therewith, and a reproduction method.

Conventional digital signal reproducing devices, for example compact disk (CD) players, are classified into two systems; i.e., one system which uses an analog data strobe circuit for a data strobe circuit which intercepts serial data and reproduces a clock synchronous with the data and the other system which uses a digital data strobe circuit for the analog data strobe circuit.

The former system which uses the analog data strobe circuit is provided with an analog phase locked loop (PLL) which makes a phase comparison between the output of a voltage-controlled oscillator (VCO) and a polarity-inverted version of an input EFM (Eight to Fourteen Modulation code) signal (a required data component signal separated from the reproduced output of a pickup) since the EFM signal has a pulse period of 3T–11T where T is the period of the transmission rate to thereby intercept data and reproduce a clock synchronous with the data, as disclosed in JP-A-59-124013.

In the latter system which uses the digital data strobe circuit, a counter which operates at a clock having a frequency high sufficiently compared to the transmission rate used to extract only a falling edge of a timing allowed in format from the received EFM signal and be synchronized with the falling edge in operation, thus reproducing a clock synchronous with the data from the counter outputting and fetching the data thereby, as disclosed in JP-A-58-64840.

In the above conventional system which uses the analog data strobe circuit, the analog PLL is locked to the polarity-inverted version of the received EFM signal to reproduce a clock synchronous with the data. If signals input to the data strobe circuit successively drop out due to a possible crack on a disk, the PLL locked so far to the received signal is unlocked from the same and the VCO starts to oscillate in a free running manner. Thus, even after the dropout of the received signals due to the crack disappears, no clocks are reproduced from the data for an interval of time corresponding to the pull-in time of the PLL. That is, it takes much time for recovery to the steady state because of the crack and a quantity of data to be lost would increase.

In the system which uses the digital data strobe circuit, the counter which operates with a clock having a frequency high sufficiently compared to the transmission rate is synchronized with a falling edge of the received signal to thereby reproduce a clock synchronous with the data. Thus, a clock synchronous with the data is reproducible from a time when the falling edge is received after the dropout of the data due to the crack. In the CD player, the time taken for the synchronous clock to become reproducible in the digital data strobe circuit after the dropout of the data due to the crack is generally short, for example about 300 μs (corresponding to the time taken for 2-frame data to become reproduced in the CD player) compared to the analog data strobe circuit. However, the digital data strobe circuit is only capable of determining the phase of the synchronous clock with the accuracy of the period of the clock of the synchronous clock reproduction counter. Therefore, in a signal-to-noise (S/N) versus error rate characteristic (where S/N is the signal level to noise level ratio of the received signal) indicative of the probability that the data intercepted with the synchronous clock reproduced by the data strobe circuit would be an error, the CD player is required to be excellent generally by more than about 4 db in S/N ratio compared to the analog data strobe circuit in order to obtain the same error rate.

That is, although the analog data strobe circuit is excellent in steady state performance, it has the problem that it is slow in recovery after the dropout of data due to a crack. In contrast, although the digital data strobe circuit is rapid in recovery after the dropout of data due to a crack, it has the problem that it is inferior in steady state performance.

SUMMARY OF THE INVENTION

The present invention is intended to solve the above problem. It is therefore an object of the present invention to provide a digital signal reproduction device which includes a data strobe circuit which is excellent in S/N versus error rate characteristic in the steady state and rapid in the recovery from dropout of data due to a crack on a CD, a digital signal reproduction method, and an integrated circuit for use therewith.

In order to achieve the above object, according to the features of the present invention, there is provided a digital signal reproduction device which includes reproduction signal reading means for reading from a recording medium a reproduced serial signal corresponding to a serial signal composed of blocks of data in a predetermined format and recorded on the recording medium and which digitally processes the reproduced serial signal in accordance with the format, the reproduction device including:

a first data strobe circuit for generating a first reproduction clock synchronous with the reproduced serial signal, intercepting the reproduced serial signal with the first reproduction signal and outputting first data;

a second data strobe circuit for generating a second reproduction clock synchronous with the reproduced serial signal, intercepting the reproduced serial signal with the second reproduced serial signal and outputting second data;

switching means for selecting one of a pair of the first data and the first reproduction clock output from the first data strobe circuit and a pair of the second data and the second reproduction clock output from the second data strobe circuit; and signal processing means for digitally processing the data selected by the switching means in accordance with the format, the switching means being switched in accordance with a signal indicative of the reproduction state of the reproduction signal reading means.

In operation, the data reproduced from the optical disk is input to the respective analog and digital data strobe circuits. Among the data and the reproduction clock synchronous with the data output from the two strobe circuits, the outputs, i.e., the data and the reproduction clock synchronous with the data, from the analog data strobe circuit are normally selected by the switching means. When data drops out due to a crack or the like on the CD, the switching means selects the outputs from the digital data strobe circuit only for an interval of time consisting of the sum of the dropout interval of the data and the pull-in time of the analog PLL on the basis of a signal indicative of the reproduction state of the reproduction signal read means (a signal indicative of the dropout interval of the data). Thus, in the steady state, the analog data strobe circuit excellent in S/N versus error rate characteristic is selected. During the data dropout, the digital data strobe circuit where the time taken from the end of the data dropout to the acquisition of the reproduction clock is shorter is selected. Thus, a digital signal reproduction device is realized in which high reliability of data for the S/N ratio of the received signal is compatible with high speed of recovery to the steady state from the transient state due to the crack.

DESCRIPTION OF THE PREFERRED EMBODIMENTS

The present invention will be described below with respect to the respective embodiments thereof shown in FIGS. 1–11A, 11B of the accompanying drawings.

Figure 1:
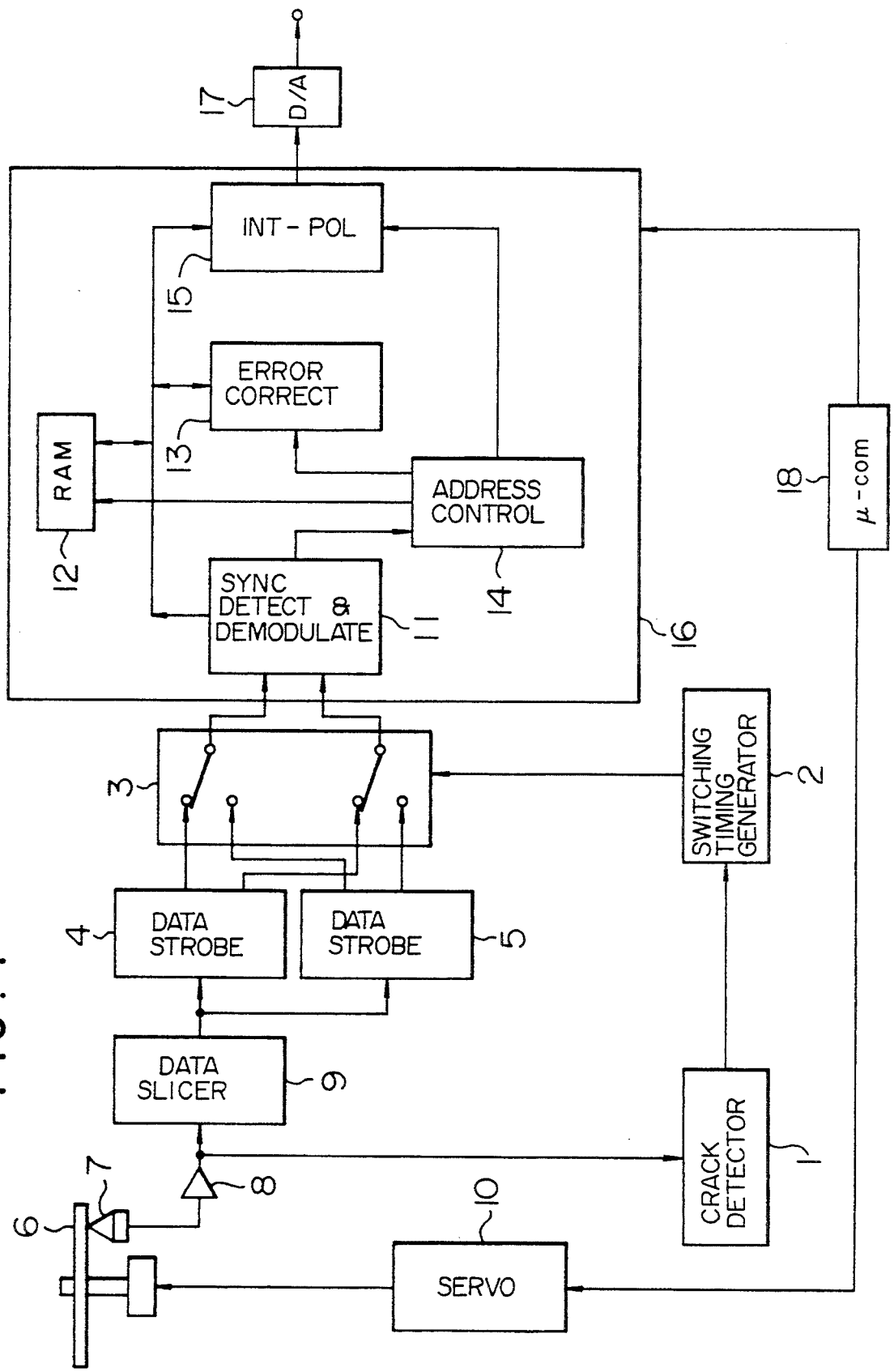
FIG. 1 is a block diagram of a digital signal reproduction device as a first embodiment of the present invention.
Figure 2:
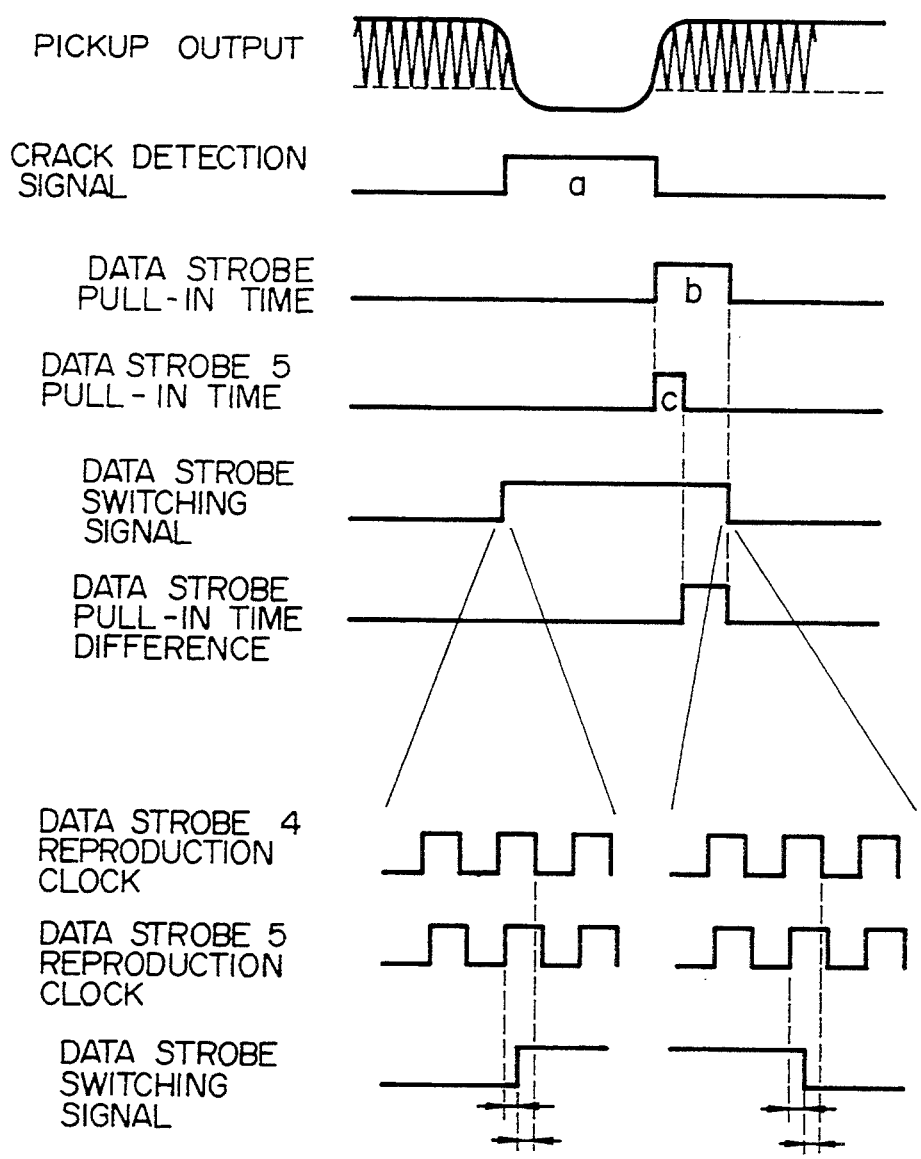
FIG. 2 is a timing chart indicative of the timing of the switching operation of a data strobe circuit of the first embodiment.

First, a first embodiment of the present invention will be described with respect to FIGS. 1 and 2. FIG. 1 is a block diagram of a digital signal reproduction device as the present embodiment. FIG. 2 is a timing chart indicative of the operation timing of the present embodiment.

Referring to FIG. 1, a reference numeral 6 denotes an optical disk where a serial signal is recorded; 7, an optical pickup which picks up a signal from the optical disk 6; 10, a servo circuit which controls the rotation of the disk 6 and the pickup 7; 8, a pre-amplifier; 1, a crack detector which detects an envelope of the signal picked up by the pickup 7 and outputs a crack detection signal at high ("H") level during non-detection of the signal envelope (i.e., it detects dropout of the reproduction signal due to a crack on the disk); 2, a switching timing generator which generates a control signal to switch a switching circuit 3 on the basis of the output of the crack detector 1; and 9, a data slicer which outputs "1" if the received signal is higher than a reference value, and "0" if otherwise.

Reference numerals 4 and 5 denote a data strobe circuit which generates a reproduction clock synchronous with a received serial signal and intercepts data with an edge of the reproduction clock. The data strobe circuit 4 is an analog data strobe circuit which is provided with an analog PLL, which includes a voltage controlled oscillator (VCO) and a phase comparator which makes a phase comparison between the received serial signal and a reference signal being the output signal of the VCO. The data strobe circuit 5 is a start-stop type digital data strobe circuit which synchronizes a counter with an edge of the received serial signal to reproduce a sync clock. Reference numeral 3 denotes a switching circuit which selects a reproduction clock and intercepted data output from a desired one of the data strobe circuits 4 and 5 in accordance with a control signal from the switching timing generator 2.

Reference numeral 11 denotes a sync detection/demodulation circuit which detects sync signals recorded at intervals of a predetermined number of data items in the serial signal to synchronize a digital signal process and which demodulates digitally modulated signals recorded on the disk; 13, an error correction circuit which detects/corrects an error on the basis of an error correction code added to data recorded on the disk 6; 12, a temporary data storage RAM which is used to de-interleave the data which has been interleaved since the time when the data was recorded on the disk 6; 15, a data interpolator which corrects data from which an error has been detected with other data from which no error has been detected; and 14, an address control circuit which controls delivery of data between the RAM 12 and a respective one of the sync detection/demodulation circuit 11, error correction circuit 13, and data interpolator 15. The elements 11–15 compose a digital signal processor 16. Reference numeral 17 denotes a D/A converter which converts a processed digital signal from the digital signal processor 16 to an analog signal. Reference numeral 18 denotes a microcomputer which provides system control over the signal processor 16 and the servo circuit 10.

Next, the respective operations of the reproduction device performed when there is a dropout in the signal due to a crack on an optical disk 6 and when an optical disk 6 has no crack thereon will be described separately. First, when there is no dropout in the signal, the crack detector 1 detects an envelope at all times since there is no dropout in the output of the preamplifier 8. Thus, the crack detection signal is at low ("L") level at all times and the data strobe switching signal generated by the switching timing generator 2 is also at "L" level at all time. Since the data strobe switching signal is at "L", the switching circuit 3 selects and outputs a reproduction clock and intercepted data from the analog data strobe circuit 4 to the digital data processor 16, which properly processes the received signal. The output of the signal processor 16 is converted by the D/A converter 17 from the digital signal to an analog signal, which is output as a voice signal. That is, when there is no dropout in the data, the data from the analog data strobe circuit 4 which is excellent in S/N versus error rate characteristic compared to the digital data strobe circuit 5 is processed.

The operation of the reproduction device performed when there is a dropout in the signal will next be described with reference to FIG. 2. During an interval a of FIG. 2 where the signal drops out, the crack detector 1 detects no envelope and outputs a crack detection signal which is at "H" level. The time taken from the dropout of the signal to subsequent rereception of the signal and acquisition of a reproduction clock signal and a signal synchronous with the reproduction clock (that is, the pull-in time of the data strobe circuit) is designated by b in the analog data strobe circuit 4 and designated by c in the digital data strobe circuit 5. In this case, the relationship b>c holds. When the crack detection signal from the crack detector 1 changes to "H" level, the switching timing generator 2 outputs the data strobe switching signal at "H" level to the switching circuit 3 only for the interval "a+b". This causes the switching circuit 3 to select the data and the clock from the digital data strobe circuit 5 only for the interval where the data strobe switching signal is at "H" level.

Thus, the digital signal reproduction device of the present embodiment is capable of reproducing data which is increased by an amount corresponding to the data strobe pull-in time difference of FIG. 2 than the reproduction device which has only the analog data strobe circuit 4. During the time when the data strobe switching signal is at "L" level, the analog data strobe circuit 4 which is excellent in S/N versus error rate characteristic is selected at all times. Thus, the reliability of data for the S/N of the received signal is improved in the steady state. The data strobe switching signal changes at a timing with some margin to the respective edges of reproduction clocks from the analog and digital data strobe circuits 4 and 5 (see the enlarged portion of FIG. 2). Thus, there is no probability that an abnormality will occur when the data strobe circuits 4 and 5 switch therebetween.

As describe above, according to the present embodiment, a digital signal reproduction device will be provided which has high reliability in the steady state because a large margin for switching timing is set against noise added to the received signal and which can reproduce only a considerably large portion of dropout data due to a possible crack on an optical disk (i.e., the data strobe section has the merits of both the analog and digital data strobe circuits).

While in the description of the present embodiment the data strobe circuits 4 and 5 are defined as the analog and digital data strobe circuits, respectively, two data strobe circuits different in characteristic may be used such that the one having a shorter pull-in time is used as the data strobe circuit 5, which produces advantages similar to those of the embodiment irrespective of whether it is of the analog or digital type.

Figure 3:
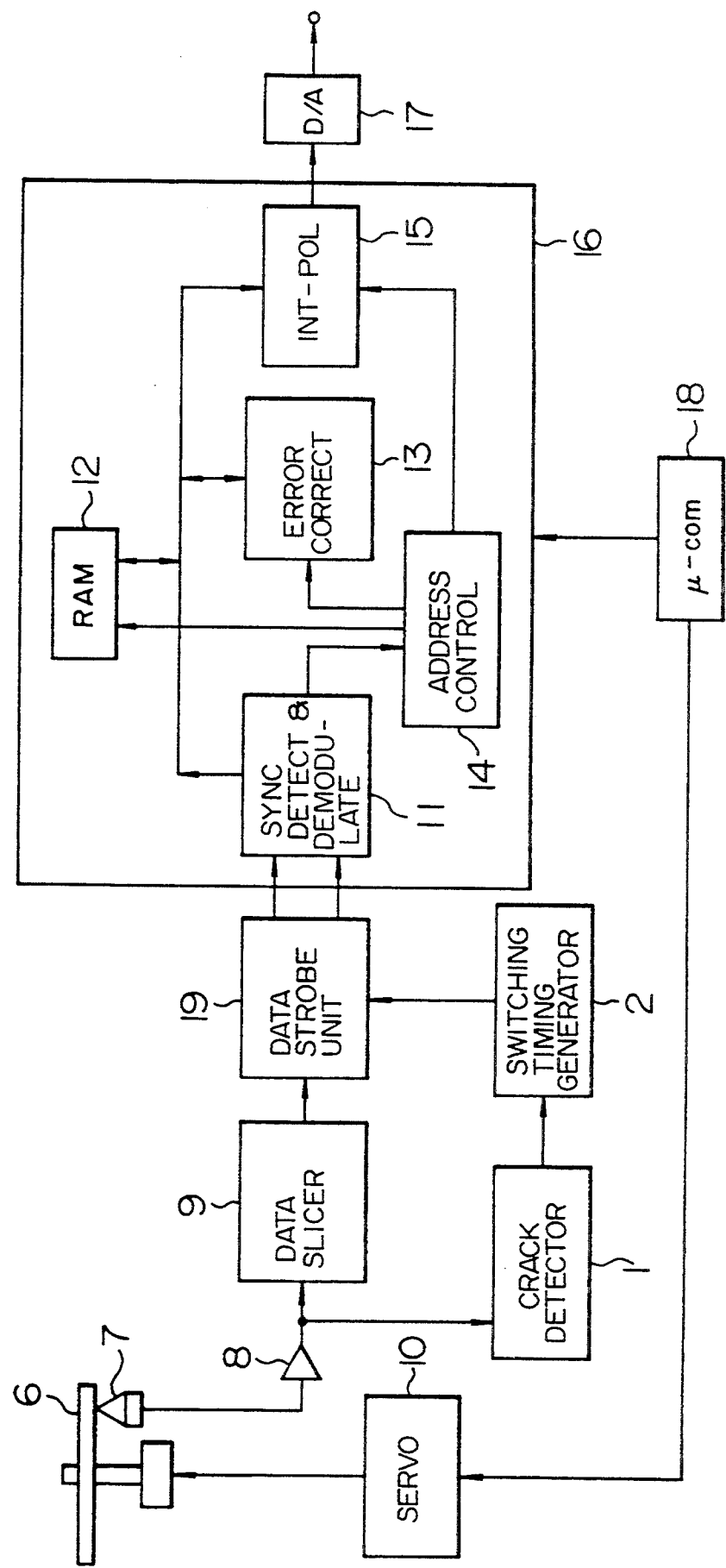
FIG. 3 is a block diagram of a digital signal reproduction device as a second embodiment of the present invention.
Figure 4:
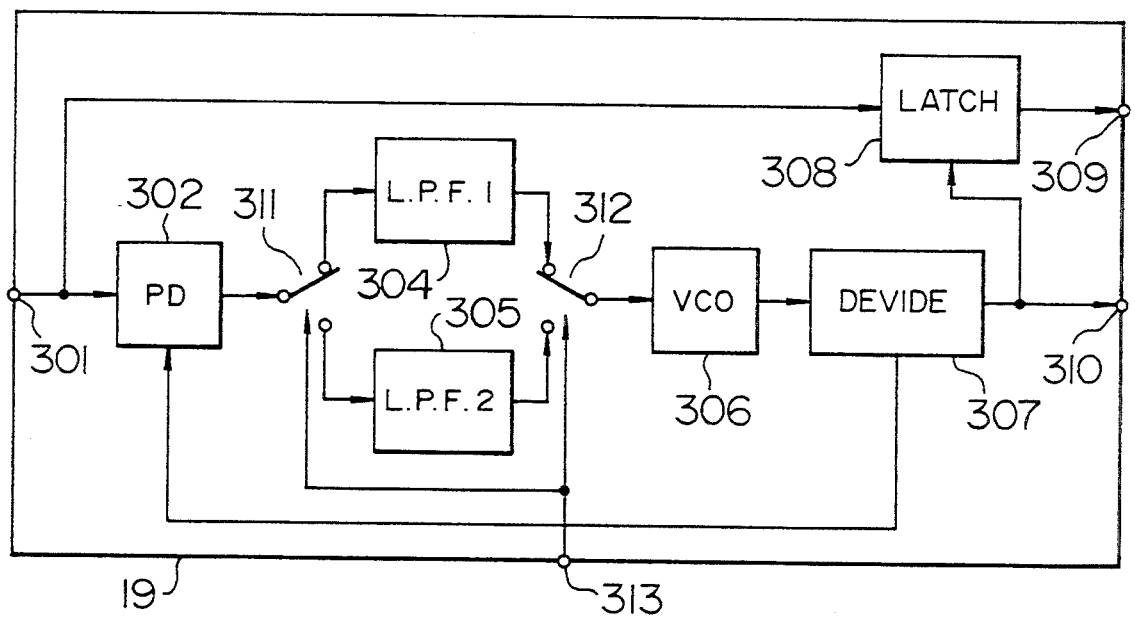
FIG. 4 is a block diagram of the digital signal reproduction device as the second embodiment which uses an analog data strobe circuit as the data strobe circuit of FIG. 3.
Figure 5:
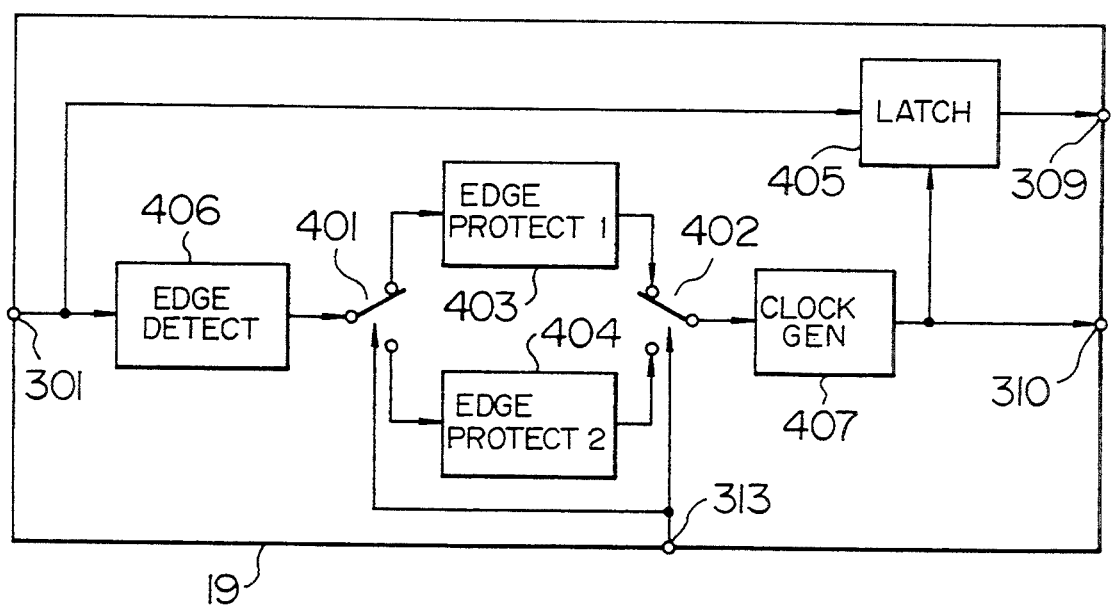
FIG. 5 is a block diagram of the digital signal reproduction device as the second embodiment which uses a digital data strobe circuit as the data strobe circuit of FIG. 3.

A second embodiment of the present invention will be described with respect to FIGS. 3–5. FIG. 3 is a block diagram of a digital signal reproduction device of the second embodiment. FIGS. 4 and 5 are block diagrams of illustrative different structures of the data strobe circuit 19 as a component of the FIG. 3 device. The present embodiment is obtained by modifying the first embodiment such that both the data strobe circuits 4 and 5 of the first embodiment are replaced with a single data strobe circuit 19 of FIG. 3; the switching circuit 3 is removed; and a data strobe switching signal from the switching timing generator 2 is directly output to the data strobe circuit 19. If the data strobe circuit 19 is an analog data strobe circuit, it has a structure of FIG. 4 while if it is a digital data strobe circuit, it has a structure of FIG. 5.

First, assume that the data strobe circuit 19 has the structure of the analog data strobe circuit of FIG. 4. In this case, in FIG. 4, reference numeral 301 denotes a signal input terminal which receives a signal from the data slicer 9; 310, an output terminal for a clock synchronous with a reproduced input signal; 309, an output terminal for data intercepted in accordance with the reproduction clock; 313, an input terminal for a data strobe switching signal from the switching timing generator 2; 306, a voltage controlled oscillator (VCO); 307, a frequency divider which divides the oscillating output from the VCO 306; 302, a phase comparator which compares the received signal from the signal input terminal 301 and the divided frequency output from the frequency divider 307; 304, 305, a filter which cuts off high frequency components; 311, 312, a changeover circuit which selects the filter 304 or 305; and 308, a latch which latches a received signal from the input terminal 301 in accordance with a clock from the frequency divider 307. The phase comparator 302; filters 304, 305; switching circuits 311, 312; voltage controlled oscillator 306; and frequency divider 307 constitutes a PLL. The filters 304, 305 are arranged such that selection of the filter 305 decreases the pull-in time of the PLL compared to selection of the filter circuit 304.

The PLL generates a clock phase-synchronous with an edge of the received signal. The characteristic of the PLL which includes its pull-in time and reliability against noise varies generally depending on its filter characteristic. The present embodiment is provided with two filters which determine the characteristic of two data strobe circuits in place of the two data strobe circuits. The switching circuits 311, 312 select the filter 305 having a shorter pull-in time for only the interval of time when the data strobe switching signal is at "H" level. Thus, if there is a dropout in the data, the characteristic of the data strobe circuit is switched. Thus, the circuit smaller in scale than the first embodiment produces the same advantages as the first embodiment.

Assume now that the data strobe circuit 19 is composed of the digital data strobe circuit of FIG. 5. In this case, in FIG. 5, reference numerals 301, 309, 310, 313 denote elements corresponding to those of FIG. 4. In FIG. 5, reference numeral 406 denotes an edge detector which detects an edge of the received signal; 403, 404, an edge protective circuit which selects a correct one among the edges detected by the edge detector 406; 401, 402, a changeover circuit which selects the edge protective circuit 403 or 404; 407, a clock generator composed of a counter synchronized with an edge signal from the edge protective circuit 403 or 404; and 405, a latch which latches the received signal with a clock generated by the clock generator 407.

In the above arrangement, the edge selective conditions of the edge protective circuit 404 are selected so as to be strict compared to those of the edge protective circuit 403. Thus, selection of the edge protective circuit 403 achieves rapid synchronization with the received signal compared that of the edge protective circuit 404. Thus, the switching circuits 401, 404 select the edge protective circuit 403 for only the interval of time which the data strobe switching signal is at "H" level. Accordingly, when there is a dropout in the data, the characteristic of the data strobe circuit is switched. Thus, the circuit small in scale compared to the first embodiment produces the same advantages as the first embodiment.

Figure 6:
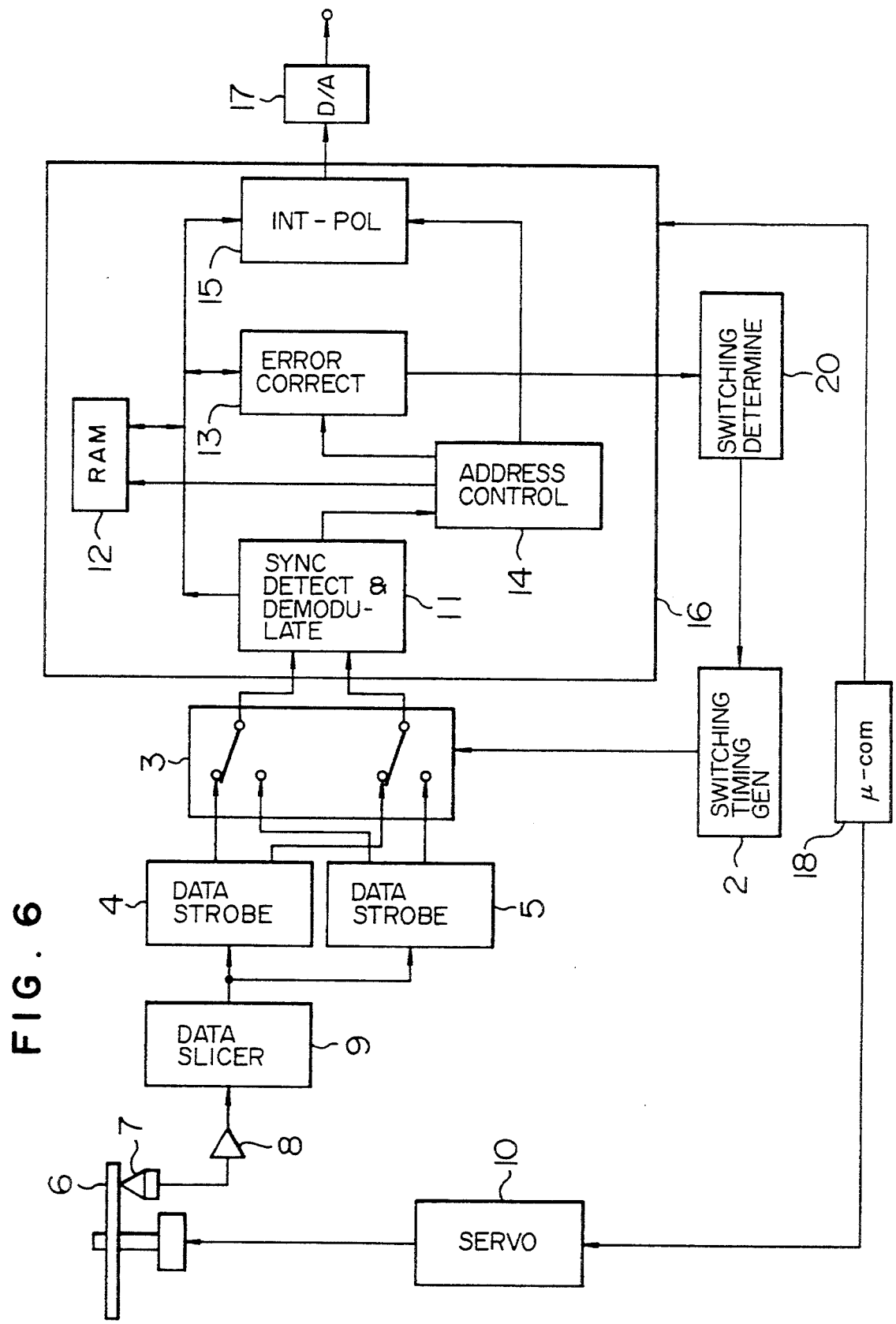
FIG. 6 is a block diagram of a digital signal reproduction device as a third embodiment of the present invention.

A third embodiment of the present invention will be described with respect to FIG. 6. FIG. 6 is a block diagram of a digital signal reproduction device as the third embodiment. The present embodiment is the same as the first embodiment except that the former has a switching determination circuit 20 in place of the crack detector 1 which outputs a signal indicative of a dropout interval of the received signal on the basis of the envelope of the received signal.

The operation of the switching determination circuit 20 will be described below. The error correction circuit 13 detects an error in the data reproduced by the optical disk 6 in accordance with an error correction code added to the data. The error correction circuit 13 inputs to the switching determination circuit 20 flag data indicative of whether an error has been detected. If the switching determination circuit 20 detects successive errors the number of which exceeds a predetermined number or when the number of errors detected in a predetermined interval of time exceeds a predetermined value, the switching determination circuit 20 determines that the data has dropped out and generates a "H"-level crack detection signal as shown in FIG. 2. The operation of the reproduction device performed after the crack detection signal is input to the switching timing generator 2 is the same as the reproduction device of the first embodiment. The present embodiment is also capable of providing such control that the data strobe circuit 4 or 5 is selected so as to reduce the number of errors detected except when successive errors are detected. Thus, the present embodiment is provided with the data strobe circuits an appropriate one of which is selected. Accordingly, a digital data reproduction device having high data reliability is provided.

Figure 7:
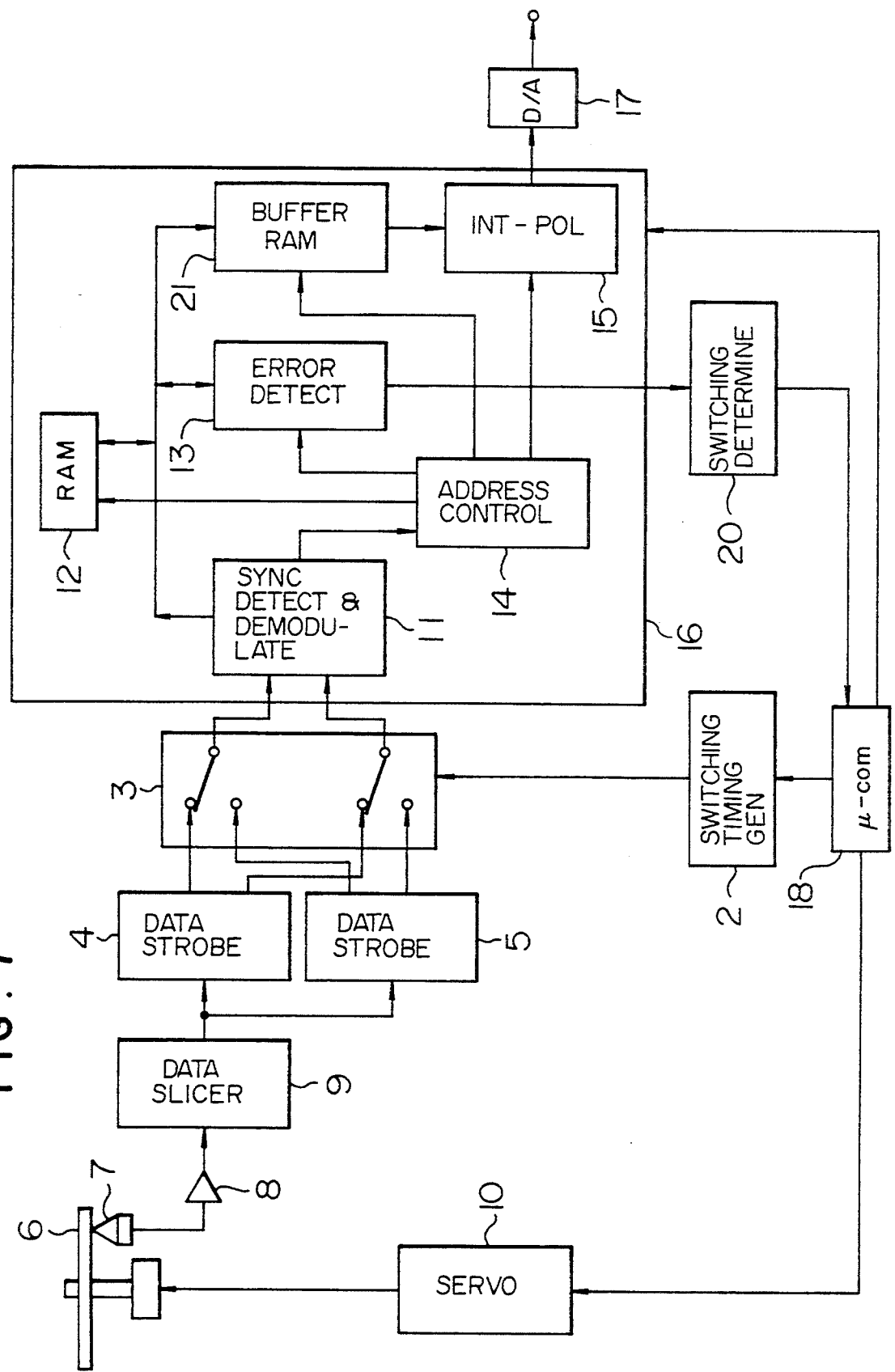
FIG. 7 is a block diagram of a digital signal reproduction device as a fourth embodiment of the present invention.

A fourth embodiment of the present invention will be described with respect to FIG. 7. FIG. 7 is a block diagram of a digital signal reproduction device as the fourth embodiment. The present embodiment is the same as the third embodiment except that in the present embodiment the output of the switching determination circuit 20 is connected not directly but through the microcomputer 18 which provides system control to the switching timing generator 2 and that a buffer RAM 21 is provided at the input of the interpolator 15.

In the present embodiment, the switching determination circuit 20 sends to the microcomputer 18 data on whether successive errors the number of which exceeds a predetermined number have been detected or the number of errors detected in a predetermined time has exceeded a predetermined value. If so, the microcomputer 18 controls the servo circuit 10 to again reproduce the appropriate data portion involving those many errors. Simultaneously, the microcomputer 18 controls the switching timing generator 2 to select the data strobe circuit 5 shorter in pull-in time by a predetermined time after the start of re-reading of the data. Thus, the time taken from the dropout of the data input to the data strobe circuit due to the re-reading of the data to the acquisition of the reproduction clock is reduced. Since the data stored in the buffer RAM 21 is reproduced during the re-reading of the data, no analog signal output from the D/A converter 17 is interrupted. Especially, when an amount of data per time reproduced from the optical disk 6 is larger than that output to the D/A converter 17, re-reading of data can be effected infinite times. As described above, according to the above embodiment, when there is a large amount of wrong data, the time taken for re-reading data out of the disk 6 is reduced.

Figure 8:
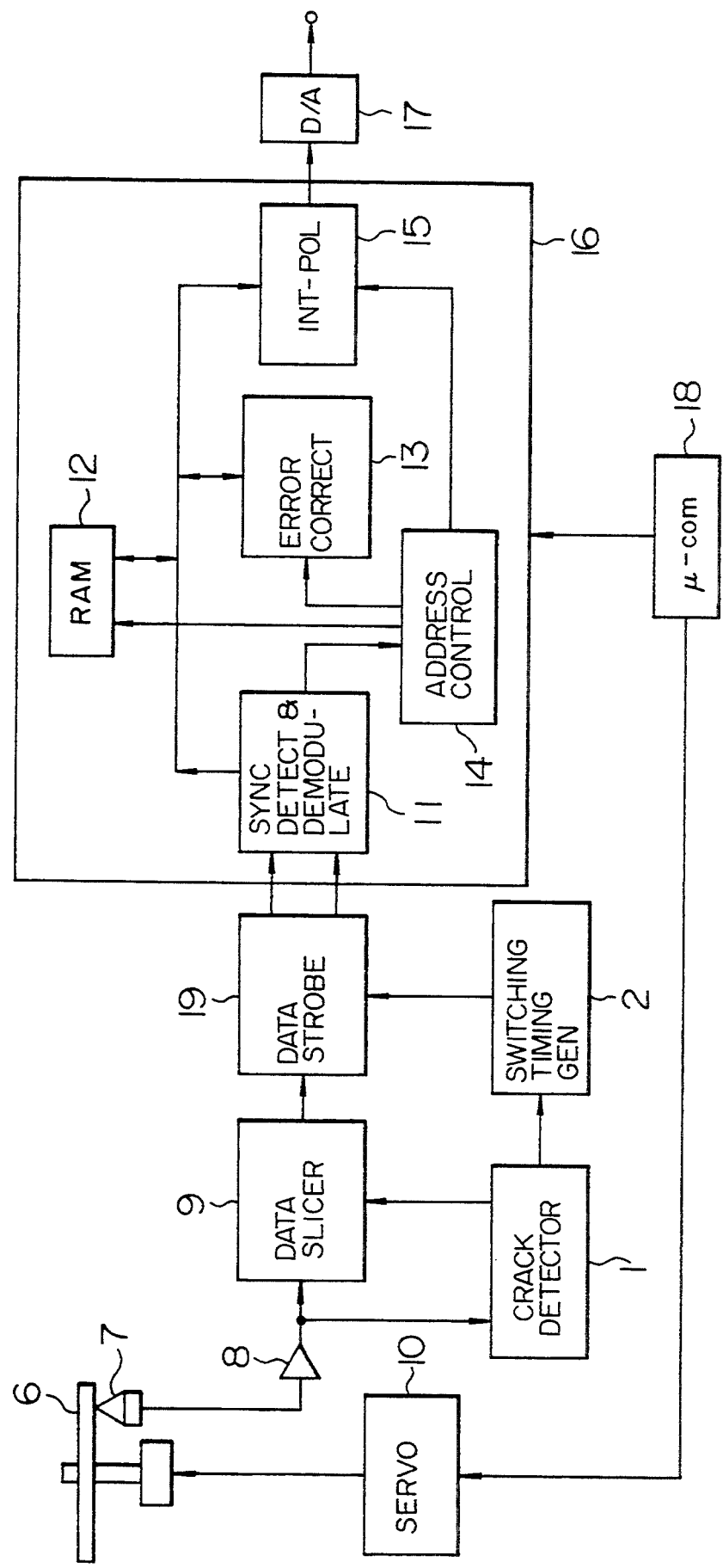
FIG. 8 is a block diagram of a digital signal reproduction device as a fifth embodiment of the present invention.

A fifth embodiment of the present invention will be described with respect to FIG. 8. FIG. 8 is a block diagram of a digital signal reproduction device of the fifth embodiment. The present embodiment is the same as the second embodiment except that the crack detector 1 outputs a crack detection signal not only to the switching timing generator 2 but also to the data slicer 9. The data slicer 9 outputs "1" if the received signal is higher than a reference value while it outputs "0" if otherwise. If the respective probabilities that the signal will be "0" and "1" are beforehand determined, the reference value can be determined on the basis of the output of the data slicer 9. If the received signal drops out, however, the reference value becomes a wrong value. Thus, the reference value should be a fixed value during the dropout of the signal indicated by the crack detection signal. This prevents the reference value from becoming wrong to thereby enhance the reliability of the digital signal reproduction device of the second embodiment.

Figure 9:
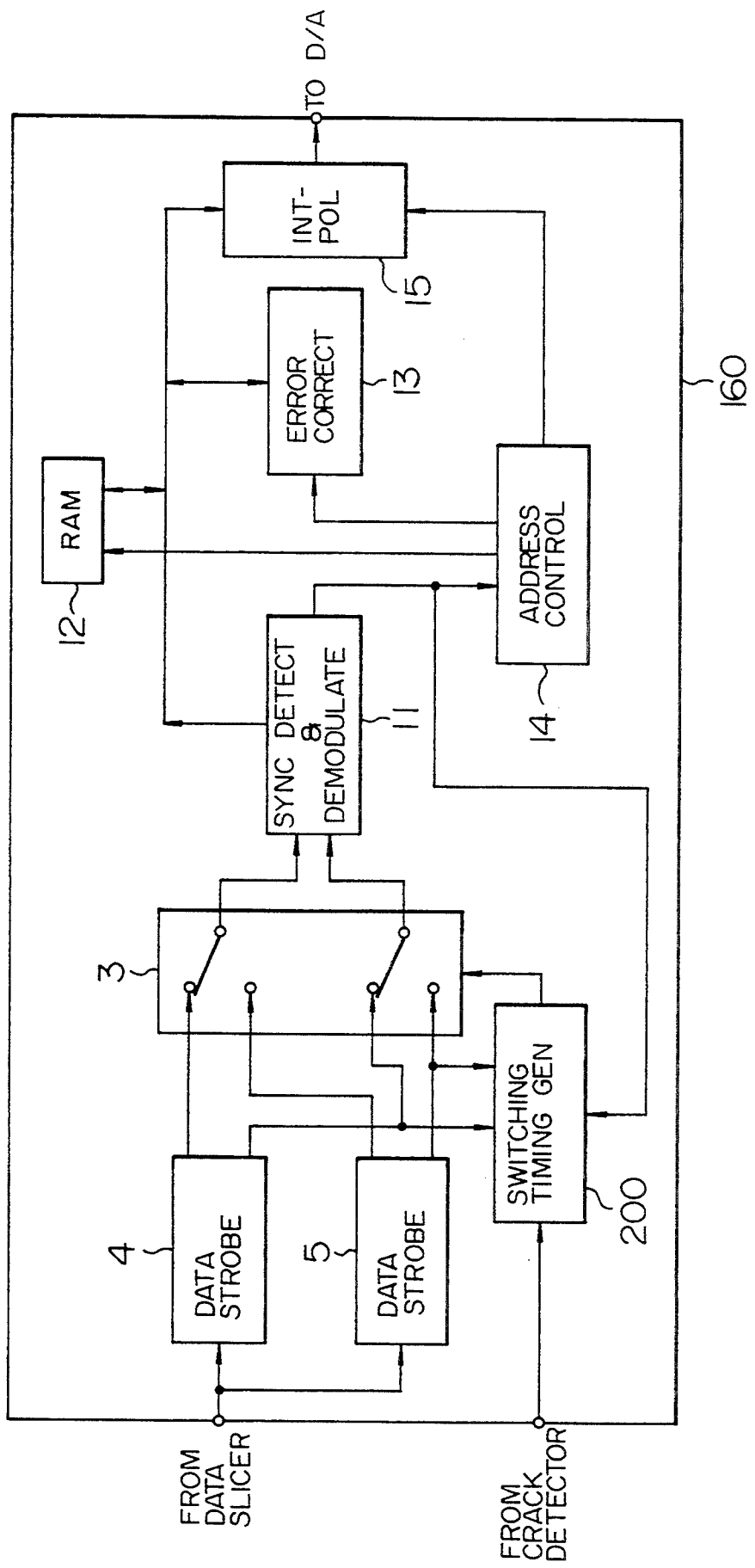
FIG. 9 is a block diagram of an essential portion of a digital signal reproduction device as a sixth embodiment of the present invention.

A sixth embodiment of the present embodiment will be described with respect to FIGS. 9–11. FIG. 9 is a block diagram of an essential portion of a digital signal reproduction device as the sixth embodiment. FIG. 10 is a timing chart indicative of the operation of a switching timing generator 200 of the present embodiment. FIG. 11 is a timing chart indicative of the switching timing of the data strobe circuit of the present embodiment.

In FIG. 9, reference numeral 160 denotes a digital signal processor composed of a semiconductor integrated circuit of sub-circuits integrated on the same substrate. The processor (semiconductor integrated circuit) 160 includes data strobe circuits 4, 5; switching circuit 3; switching timing generator 200; and a digital signal processor 16 which is the same as that of the FIG. 1 first embodiment (the sync detection/demodulation circuit 11, temporary data storage RAM 12, error correction unit 13, address control unit 14, and data interpolator 15). The switching timing generator 200 receives reproduction clocks from the data strobe circuits 4, 5; a sync signal from the sync detection/demodulation unit 11; and a crack detection signal from the crack detector 1. The switching timing generator 200 generates a switching signal or does not depending on the length of the interval of time when the crack detection signal is output, as will be described later. In FIGS. 9 and 1 (the sixth and first embodiments, respectively), the same reference numeral is given to blocks having the same function and further description of the embodiment of FIG. 9 will be omitted to avoid duplication.

Figure 10A:
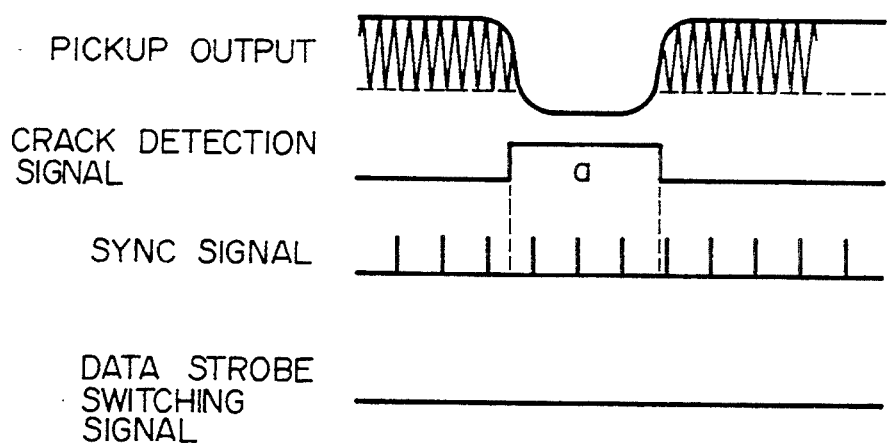
FIG. 10A and 10B are timing charts indicative of the timing of the switching operation of a digital data strobe circuit of the sixth embodiment.

The operation of the switching timing generator 200 of the present sixth embodiment will be below described with respect to the timing charts of FIGS. 10A, 10B and 11A, 11B. FIG. 10A shows that the output interval of the crack detection signal covers less than 8 sync signal intervals. The generator 200 counts a "H"-level interval of the crack detection signal, using a sync signal as the clock. When the generator 200 detects that the count has exceeded "8", it switches its output, which is the data strobe switching signal, from "L" level to "H" level. Since the count of the sync signals falling within the output interval of the crack detection signal is 8 in the example of FIG. 10A, the data strobe switching signal from the switching timing generator 200 remains at "L" level. This operation prevents switching from the analog data strobe circuit 4 to the digital data strobe circuit 5 when the crack is short.

Figure 10B:
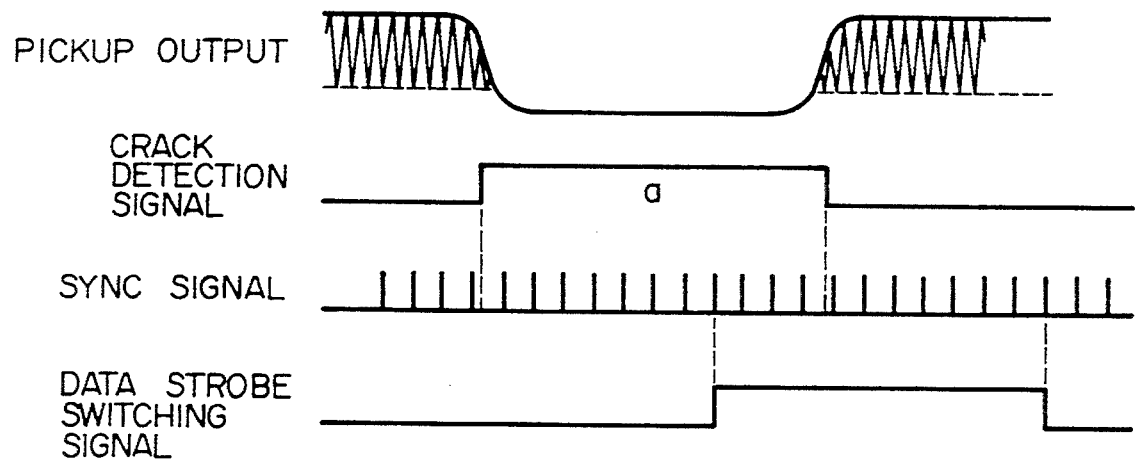

FIG. 10B shows the operation of the reproduction device of the present embodiment performed when the interval of the crack detection signal covers an interval of 8 sync signals or more. As shown in FIG. 10B, the switching timing generator 200 changes the data strobe switching signal from the "L" level to the "H" level when the count of the sync signals in the output interval of the crack detection signal has become 8. The switching timing generator 200 starts to count time, using the sync signal as a clock, since the time when the crack detection signal changes from the "H" level to the "L" level. When the count of the sync signals becomes 8 since the crack detection changed from the "H" level to the "L" level, the generator 200 changes the data strobe switching signal to the "L" level. As described above, the generator 200 performs the switching operation of the data strobe circuit in the case of the presence of a long crack and selects the output of the digital data strobe circuit 5 until the crack ends and the analog data strobe circuit 4 is then locked to the reproduction signal.

Figure 11A:
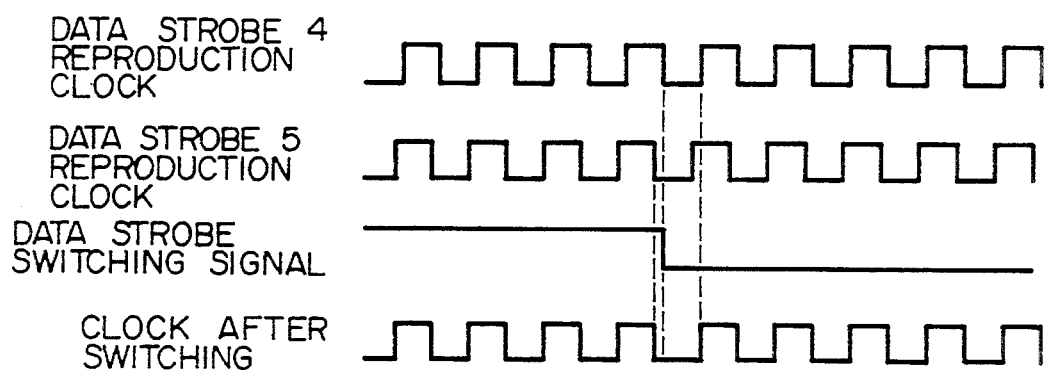
FIG. 11A and 11B are timing charts indicative of the detailed timing of signals switching the circuit connection from the digital data strobe circuit of the sixth embodiment to the analog data strobe circuit.
Figure 11B:
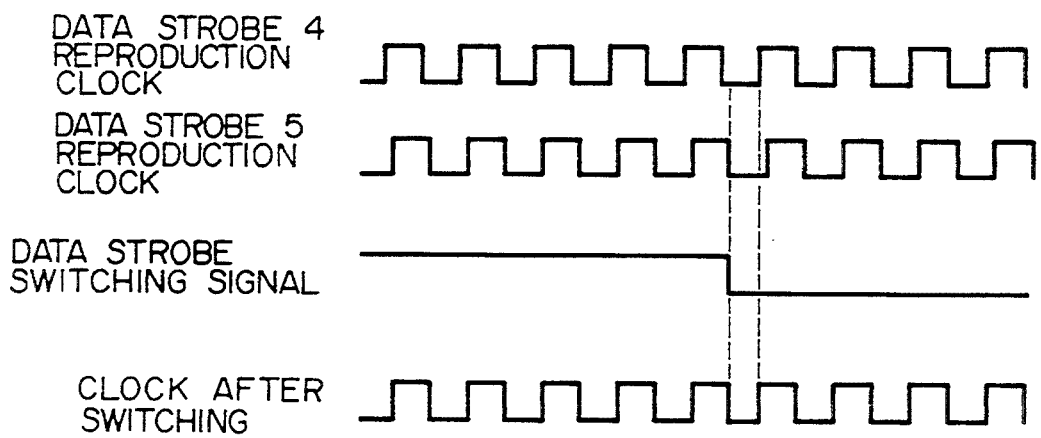

FIGS. 11A, 11B show the details of the switching timing from the digital data strobe circuit 5 to the analog data strobe circuit 4. FIG. 11A is a timing chart indicative of the operation performed when the reproduction clock of the analog data strobe circuit 4 is delayed in phase compared to the reproduction clock of the digital data strobe circuit 5. The phase comparator included in the switching timing generator 200 compares the phases of the reproduction clocks of the digital and analog strobe circuits 5 and 4 to detect that the reproduction clock of the analog data strobe circuit 4 is delayed in phase compared to that of the digital data strobe circuit 5. As a result, the generator 200 generates a data strobe switching signal synchronously with a falling edge of the reproduction clock of the phase-delayed analog data strobe circuit 4 to thereby avoid possible occurrence of troubles in the selected clock.

FIG. 11B is a timing chart indicative of the operation performed when the reproduction clock of the digital data strobe circuit 5 is delayed in phase compared to the reproduction clock of the analog data strobe circuit 4. The phase comparator makes a comparison similar to the above to detect that the reproduction clock of the digital data strobe circuit 5 is delayed in phase compared to the analog data strobe circuit 4. As a result, the generator 200 generates a data strobe switching signal synchronously with a falling edge of the reproduction clock of the phase-delayed digital data strobe circuit 5 to thereby avoid possible occurrence of troubles in the selected clock.

As described above, in the sixth embodiment the switching timing generator 200 selectively operates to perform no useless switching operation in the case of the presence of a short crack such as does not cause the analog data strobe circuit 4 to be unlocked.

Inclusion of the analog and digital data strobe circuits 4 and 5 in the semiconductor integrated circuit (digital signal processor) 160 eliminates the need for leading out two clock systems on a circuit substrate to thereby reduce undesired radiation.

As described above, according to the present invention, a reproduction state-suitable data strobe circuit is selected in which the reliability of the received signal against noise is high, the time taken from the dropout of the received signal to the acquisition of a reproduction clock is reduced and is suitable for the reproduction state. Thus, a digital signal reproduction device is provided in which the reliability of data is high.

Provision of the digital signal processor including two data strobe circuits in the single semiconductor integrated circuit suppresses an increase in useless radiation due to an increase in the number of clocks.

What is claimed is:

1. A digital signal reproduction apparatus which includes reproduction signal reading means for reading from a recording medium to reproduce a serial signal composed of blocks of data in a predetermined format and recorded on the recording medium and processing means for digitally processing the reproduced serial signal in accordance with the format, said reproduction apparatus comprising:

a first data strobe circuit for generating a first reproduction clock synchronous with the reproduced serial signal, intercepting the reproduced serial signal with the first reproduction clock and outputting first data;

a second data strobe circuit for generating a second reproduction clock synchronous with the reproduced serial signal, intercepting the reproduced serial signal with the second reproduction clock and outputting second data;

switching means for selecting one of a pair of the first data and the first reproduction clock output from said first data strobe circuit and a pair of the second data and the second reproduction clock output from said second data strobe circuit; and signal processing means for digitally processing the data selected by said switching means in accordance with the format;

said switching means being switched in accordance with a signal indicative of the reproduction state of said reproduction signal reading means, said first data strobe circuit including an analog data strobe circuit which comprises a voltage controlled oscillator and a phase comparator for comparing the first reproduction clock generated by said voltage controlled oscillator and the reproduced serial signal with respect to phase to form an analog PLL controlling the oscillating frequency of said voltage controlled oscillator in accordance with the output of said phase comparator; and said second data strobe circuit including a digital data strobe circuit synchronizing the second production clock with an edge of the reproduced serial signal.

2. A digital signal reproduction apparatus according to claim 1, wherein the signal indicative of the reproduction state of said reproduction signal reading means contains a signal indicative of dropout of the reproduced serial signal due to a crack or the like on the recording medium, and said switching means selects the output of said digital strobe circuit for a predetermined interval of time T subsequent to the dropout interval of the reproduced serial signal when the detected dropout interval is longer than a predetermined time τ.

3. A digital signal reproduction apparatus according to claim 2, wherein the predetermined interval of time T subsequent to the dropout interval of the reproduced serial signal is larger in value than the pull-in time of said analog PLL.

4. A digital signal reproduction apparatus according to claim 2, wherein the predetermined time τ is larger in value than a time of from absence of the reproduced serial signal to occurrence of unlocking of said analog PLL.

5. A digital signal reproduction apparatus according to claim 2, wherein said reproduction reading means comprises an optical pickup for detecting the reproduced serial signal from an optical disk as the recording medium; and the signal indicative of the reproduction state of said reproduction signal reading means comprises a signal output from an envelope detector for detecting an envelope of the output of said optical pickup, comparing the envelope with a predetermined level, and outputting the result of the comparison.

6. A digital signal reproduction apparatus according to claim 1, comprising:

error detection means for detecting an error from an error correction code included in the reproduced serial signal; and switching determination means for controlling said switching means in accordance with the number of errors detected by said error detection means; and wherein when said error detection means detects errors the number of which is larger than a predetermined number in a predetermined interval of time or successive errors the number of which is larger than a predetermined number, said switching determination means determines that the reproduced serial signal has dropped out and causes said switching means to select the output of said digital data strobe circuit for a predetermined interval of time T subsequent to the interval of dropout of the reproduced serial signal.

7. A digital signal reproduction apparatus which includes reproduction signal reading means for reading from a recording medium to reproduce a serial signal composed of blocks of data in a predetermined format and recorded on the recording medium and processing means for digitally processing the reproduced serial signal in accordance with the format, said reproduction apparatus comprising:

a first data strobe circuit for generating a first reproduction clock synchronous with the reproduced serial signal, intercepting the reproduced serial signal with the first reproduction clock and outputting first data;

a second data strobe circuit for generating a second reproduction clock synchronous with the reproduced serial signal, intercepting the reproduced serial signal with the second reproduction clock and outputting second data;

switching means for selecting one of a pair of the first data and the first reproduction clock output from said first data strobe circuit and a pair of the second data and the second reproduction clock output from said second data strobe circuit; and signal processing means for digitally processing the data selected by said switching means in accordance with the format, said switching means being switched in accordance with a signal indicative of the reproduction state of said reproduction signal reading means;

the signal indicative of the reproduction state of said reproduction signal reading means containing a signal indicative of dropout of the reproduced serial signal due to a crack or the like on the recording medium; and said switching means selecting the output of said second data strobe circuit for a predetermined interval of time T subsequent to the dropout interval of the reproduced serial signal when the detected dropout interval is longer than a predetermined time τ, and selects the output of said first data strobe circuit in place of the output of said second data strobe circuit after a lapse of the predetermined time T; and a switching signal from said switching means after the lapse of the predetermined time T is synchronous with a phase-delayed one of the first and second reproduction clocks on the basis of result of comparison of the first and second reproduction clocks with respect to phase.

8. A digital signal reproduction method performed in a digital signal reproduction apparatus which comprises a first data strobe circuit for generating a first reproduction clock synchronous with a received reproduced serial signal, intercepting the reproduced serial signal with the first reproduction clock and outputting first data; a second data strobe circuit for generating a second reproduction clock synchronous with the received reproduced serial signal, intercepting the reproduced serial signal with the second reproduction clock and outputting second data; a switching circuit for selecting one of a pair of the first data and the first reproduction clock output from said first data strobe circuit and a pair of the second data and the second reproduction clock output from said second data strobe circuit; and a signal processor for digitally processing the data selected by said switching circuit in accordance with the format, said switching circuit being switched in accordance with the reproduction state of the reproduced serial signal, the method comprising the steps of:

detecting an interval of dropout t" of the reproduced serial signal;

determining whether t">T" where T" is a predetermined time;

causing the switching circuit to select the output of the second data strobe circuit for a predetermined interval T subsequent to the interval of dropout t" when t">T" at the determining step; and causing the switching circuit to select the output of the first data strobe circuit after the process at the causing step.

9. A digital signal reproduction method performed in a digital signal reproduction apparatus which includes an optical pickup for detecting a reproduced serial signal from an optical disk; a first data strobe circuit for generating a first reproduction clock synchronous with the reproduced serial signal received from the optical pickup, intercepting the reproduced serial signal with the first reproduction clock and outputting first data; a second data strobe circuit for generating a second reproduction clock synchronous with the reproduced serial signal received from the optical pickup, intercepting the reproduced serial signal with the second reproduction clock and outputting second data; a switching circuit for selecting one of a pair of the first data and the first reproduction clock output from said first data strobe circuit and a pair of the second data and the second reproduction clock output from said second data strobe circuit; and a signal processing circuit for performing a digital process on the data selected by said switching circuit in accordance with the format, inclusive of detection of errors from an error correction code included in the reproduced serial signal; the switching circuit being switched in accordance with the reproduction state of the reproduced signal, said method comprising the steps of:

counting the number of errors n detected in a predetermined time or the number of successive errors n';

determining whether n'>N' where N is a predetermined number or whether n'>N' where N' is the predetermined number of successive errors;

causing the switching circuit to select the output of the second data strobe circuit when n>N or n'>N' at the determining step; and a predetermined period of time after said determining condition of n>N or n'>N' is not met, switching the switching circuit which has selected the output of the second data strobe circuit to the output of the first data strobe circuit.

10. A digital signal reproduction method performed in a digital signal reproduction apparatus which includes an optical pickup for detecting a reproduced serial signal from an optical disk; a first data strobe circuit for generating a first reproduction clock synchronous with the reproduced serial signal received from the optical pickup, intercepting the reproduced serial signal with the first reproduction clock and outputting first data; a second data strobe circuit for generating a second reproduction clock synchronous with the reproduced serial signal received from the optical pickup, intercepting the reproduced serial signal with the second reproduction clock and outputting second data; a switching circuit for selecting one of a pair of the first data and the first reproduction clock output from said first data strobe circuit and a pair of the second data strobe circuit; and a signal processing circuit for performing a digital processor the data selected by said switching circuit in accordance with the format the switching circuit being switched in accordance with the reproduction state of the reproduced signal, said method comprising the steps of:

obtaining an interval of time t' when the envelope of the signal detected from the optical pickup fails to be detected;

determining whether t'>T' where T' is a predetermined time;

causing the switching circuit to select the output of the second data strobe circuit when t'>T' at the determining step; and a predetermined period of time after again detecting the envelope of the signal detected from the optical pickup, switching the switching circuit which has selected the output of the second data strobe circuit to the output of the first data strobe circuit.

11. A digital signal reproduction method according to claim 10, wherein said first data strobe circuit includes an analog data strobe circuit which comprises a voltage controlled oscillator and a phase comparator for comparing the first reproduction clock generated by said voltage controlled oscillator and the reproduced serial signal with respect to phase to form an analog PLL for controlling the oscillator in accordance with the output of said phase comparator; and said second data strobe circuit includes a digital data strobe circuit for synchronizing the second reproduction clock with an edge of the serial signal.

12. A digital signal reproduction method according to claim 9, wherein said first data strobe circuit includes an analog data strobe circuit which comprises a voltage controlled oscillator to form an analog PLL for controlling the oscillating frequency of said voltage controlled oscillator in accordance with the output of said phase comparator; and said second data strobe circuit includes a digital data strobe circuit for synchronizing the second reproduction clock with an edge of the serial signal.

13. A digital signal reproduction method according to claim 10, wherein said first data strobe circuit includes an analog data strobe circuit which comprises a voltage controlled oscillator and a phase comparator for comparing the first reproduction clock generated by said voltage controlled oscillator and the reproduced serial signal with respect to phase to form an analog PLL for controlling the oscillating frequency of said voltage controlled oscillator in accordance with the output of said phase comparator; and said second data circuit includes a digital data strobe circuit for synchronizing the second reproduction clock with an edge of the serial signal.

14. A digital signal reproduction apparatus according to claim 2, wherein said reproduction reading means comprises a pickup for detecting the reproduced serial signal from the recording medium; and the signal indicative of the reproduction state of said reproduction signal reading means includes a signal output from an envelope detector for detecting an envelope of the output of said pickup, comparing the envelope with a predetermined level, and outputting the result of the comparison.

15. A digital signal reproduction method performed in a digital signal reproduction apparatus which includes a pickup for detecting a reproduced serial signal from a disk; a first data strobe circuit for generating a first reproduction clock synchronous with the reproduced serial signal received from the pickup; intercepting the reproduced serial signal with the first reproduction clock and outputting first data; a second data strobe circuit for generating a second reproduction clock synchronous with the reproduced serial signal received from the pickup, intercepting the reproduced serial signal with the second reproduction clock and outputting second data; a switching circuit for selecting one of a pair of the first data and the first reproduction clock output from said first data strobe circuit and a pair of the second data and the second reproduction clock output from said second data strobe circuit; and a signal processing circuit for performing a digital process on the data selected by said switching circuit in accordance with the format; the switching circuit being switched in accordance with the reproduction state of the reproduced signal, said method comprising the steps of:

obtaining an interval of time t' when the envelope of the signal detected from the pickup fails to be detected;

determining whether t'>T' where T' is a predetermined time;

causing the switching circuit to select the output of the second data strobe circuit when t'>T' at the determining step; and a predetermined period of time after again detecting the envelope of the signal detected from the pickup, switching the switching circuit which has selected the output of the second data strobe circuit to the output of the first data strobe circuit.

\* \* \* \* \*